(12) United States Patent
Danilov et al.

(10) Patent No.: US 10,977,131 B2
(45) Date of Patent: Apr. 13, 2021

(54) DATA STORAGE COMPOSITE LAYOUTS FOR DATA OBJECTS

(71) Applicant: Seagate Technology LLC, Cupertino, CA (US)

(72) Inventors: Nikita Danilov, Moscow (RU); Nathaniel Rutman, Portland, OR (US)

(73) Assignee: Seagate Technology LLC, Fremont, CA (US)

( * ) Notice: Subject to any disclaimer, the term of this patent is extended or adjusted under 35 U.S.C. 154(b) by 765 days.

(21) Appl. No.: 15/707,523

(22) Filed: Sep. 18, 2017

(65) Prior Publication Data
US 2018/0232282 A1    Aug. 16, 2018

(30) Foreign Application Priority Data

Feb. 10, 2017    (RU) .................................. 2017104408

(51) Int. Cl.
| | | |
|---|---|---|
| *G06F 11/14* | (2006.01) | |
| *G06F 3/06* | (2006.01) | |
| *G06F 16/188* | (2019.01) | |
| *G06F 16/28* | (2019.01) | |
| *G06F 16/18* | (2019.01) | |

(52) U.S. Cl.
CPC .......... *G06F 11/1435* (2013.01); *G06F 3/061* (2013.01); *G06F 3/064* (2013.01); *G06F 3/0619* (2013.01); *G06F 3/0665* (2013.01); *G06F 3/0689* (2013.01); *G06F 16/188* (2019.01); *G06F 16/1847* (2019.01); *G06F 16/285* (2019.01); *G06F 2201/84* (2013.01)

(58) Field of Classification Search
CPC .. G06F 11/1435; G06F 3/0619; G06F 3/0665; G06F 3/0689; G06F 3/064; G06F 3/061; G06F 16/188; G06F 16/285; G06F 16/1847; G06F 2201/84
See application file for complete search history.

(56) References Cited

U.S. PATENT DOCUMENTS

| | | | |
|---|---|---|---|
| 5,963,962 A | 10/1999 | Hitz et al. | |
| 6,874,061 B1* | 3/2005 | Bridge .................. | G06F 3/0608 711/114 |
| 7,299,325 B1* | 11/2007 | Waterhouse ........ | G06F 11/1076 707/999.202 |
| 7,403,987 B1* | 7/2008 | Marinelli ............ | H04L 43/0817 707/999.202 |
| 7,409,494 B2 | 8/2008 | Edwards et al. | |
| 7,539,709 B1* | 5/2009 | Vengerov ................ | G06F 16/10 |
| 7,730,171 B2* | 6/2010 | Frazier .................... | G06F 16/21 709/223 |
| 7,873,596 B2 | 1/2011 | Pudipeddi et al. | |

(Continued)

*Primary Examiner* — Robert W Beausoliel, Jr.
*Assistant Examiner* — Susan F Rayyan
(74) *Attorney, Agent, or Firm* — Mueting Raasch Group

(57) ABSTRACT

A composite layout including a plurality of ranked sub-layouts may be used to provide various functionality for data object look-up and file system activities. Each sub-layout may include mapping information linking one or more extents of a data object to one or more locations on one or more storage apparatuses. Generally, mapping information in the highest priority sub-layout including mapped extents may be used during "reads" while the highest priority sub-layout may be used for "writes."

18 Claims, 10 Drawing Sheets

(56) References Cited

U.S. PATENT DOCUMENTS

| | | | | |
|---|---|---|---|---|
| 8,392,370 B1* | 3/2013 | Whitney | G06F 3/067 | 707/640 |
| 8,443,153 B1* | 5/2013 | Edwards | G06F 11/1076 | 711/147 |
| 8,555,022 B1* | 10/2013 | Edwards | G06F 3/0649 | 711/170 |
| 8,732,518 B2* | 5/2014 | Storer | G06F 11/008 | 714/6.1 |
| 8,825,963 B1* | 9/2014 | Edwards | G06F 3/064 | 711/147 |
| 8,843,517 B1* | 9/2014 | Koo | G06F 3/0689 | 707/770 |
| 8,850,130 B1* | 9/2014 | Aron | G06F 9/52 | 711/150 |
| 9,026,705 B2* | 5/2015 | Feehrer | G06F 13/24 | 710/266 |
| 9,026,765 B1* | 5/2015 | Marshak | G06F 3/061 | 711/114 |
| 9,032,164 B2* | 5/2015 | Rupanagunta | G06F 3/0613 | 711/154 |
| 9,395,937 B1* | 7/2016 | Si | G06F 3/0685 | |
| 9,477,431 B1* | 10/2016 | Chen | G06F 3/0689 | |
| 9,600,559 B2* | 3/2017 | Xue | G06F 16/285 | |
| 10,261,717 B1* | 4/2019 | Martin | G06F 3/061 | |
| 2002/0161855 A1* | 10/2002 | Manczak | H04L 67/06 | 709/219 |
| 2004/0199744 A1* | 10/2004 | Bolik | G06F 3/0644 | 711/220 |
| 2005/0246382 A1 | 11/2005 | Edwards | | |
| 2007/0130423 A1* | 6/2007 | Liu | G06F 3/0605 | 711/114 |
| 2007/0239944 A1* | 10/2007 | Rupanagunta | G06F 3/0664 | 711/147 |
| 2011/0208940 A1* | 8/2011 | Naganuma | G06F 3/0665 | 711/170 |
| 2012/0047111 A1* | 2/2012 | Hayden | G06F 16/128 | 707/649 |
| 2013/0185503 A1* | 7/2013 | Bhatta | G06F 16/1815 | 711/114 |
| 2013/0205183 A1* | 8/2013 | Fillingim | G06F 12/0253 | 714/773 |
| 2013/0290648 A1* | 10/2013 | Shao | G06F 3/0689 | 711/154 |
| 2014/0019413 A1 | 1/2014 | Braam et al. | | |
| 2015/0089134 A1* | 3/2015 | Mukherjee | G06F 15/8084 | 711/114 |
| 2015/0106579 A1* | 4/2015 | Barrus | G06F 3/0655 | 711/159 |
| 2015/0134604 A1* | 5/2015 | Efrati | H04W 4/12 | 707/609 |
| 2015/0331775 A1* | 11/2015 | Slik | G06F 11/1451 | 714/6.23 |
| 2016/0062834 A1* | 3/2016 | Benight | H04L 67/1097 | 714/766 |
| 2016/0139821 A1* | 5/2016 | Dolph | G06F 3/064 | 711/103 |
| 2016/0210306 A1* | 7/2016 | Kumarasamy | G06F 16/178 | |
| 2016/0230928 A1* | 8/2016 | Lewis | F16M 11/2014 | |
| 2017/0206212 A1* | 7/2017 | Srivilliputtur Mannarswamy | G06F 3/064 | |
| 2017/0323028 A1* | 11/2017 | Jonker | G06F 16/9024 | |
| 2018/0121129 A1* | 5/2018 | Sawhney | G06F 3/0604 | |

* cited by examiner

DATA STORAGE COMPOSITE LAYOUTS FOR DATA OBJECTS

This application claims the benefit of priority under 35 U.S.C. § 119(a) of RU Application No. 2017104408 filed Feb. 10, 2017, the disclosure of which is incorporated by reference herein in its entirety.

SUMMARY

One exemplary system may include one or more data storage apparatuses and computing apparatus including, or comprising, one or more processors. The computing apparatus maybe operably coupled to the one or more data storage apparatuses and configured to define a composite layout corresponding to a data object stored on the one or more storage apparatuses. The composite layout may include, or comprise, a plurality of sub-layouts ranked from a lowest priority to a highest priority, and each sub-layout may include, or comprise, mapping information linking one or more extents of the data object to one or more locations on the one or more storage apparatuses where the one or more extents of the data object are stored.

One exemplary method may include providing define a composite layout for each of a plurality of data objects stored on the one or more storage apparatuses. Each composite layout may include, or comprise, a plurality of sub-layouts ranked from a lowest priority to a highest priority. Each sub-layout may include, or comprise, mapping information linking one or more extents of each data object to one or more locations on the one or more storage apparatuses where the one or more extents of the data object are stored. The exemplary method may further include reading and writing the plurality of data objects using the composite layout for each of a plurality of data objects.

One exemplary composite layout corresponding to a data object describing one or more locations of one or more extents of the data object on one or more storage apparatuses may include a plurality of sub-layouts ranked from a lowest priority to a highest priority. Each sub-layout may include mapping information linking one or more extents of the data object to one or more locations on the one or more storage apparatuses where the one or more extents of the data object are stored.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

The present disclosure is related to systems, methods, and processes utilizing file system data location lookup in dynamic environments. As further described herein, the exemplary systems, methods, and processes may reduce the computational complexity of describing file data location in a dynamic environment and enable a range of layout-related file system features using a common descriptive format and a minimized code path. Generally, systems, methods, and processes may utilize, or include, exemplary composite layouts with a set of useful properties and/or mechanisms associated therewith. For example, the exemplary composite layout may include, or be composed, of a set of sub-layouts. The sub-layouts may occupy a particular ordered rank in the composite layout or structure. New writes may be directed to the highest-ranked sub-layout, and reads are may be directed to the highest-ranked simple layout that has a mapped extent for the file range requested.

Figure 1:
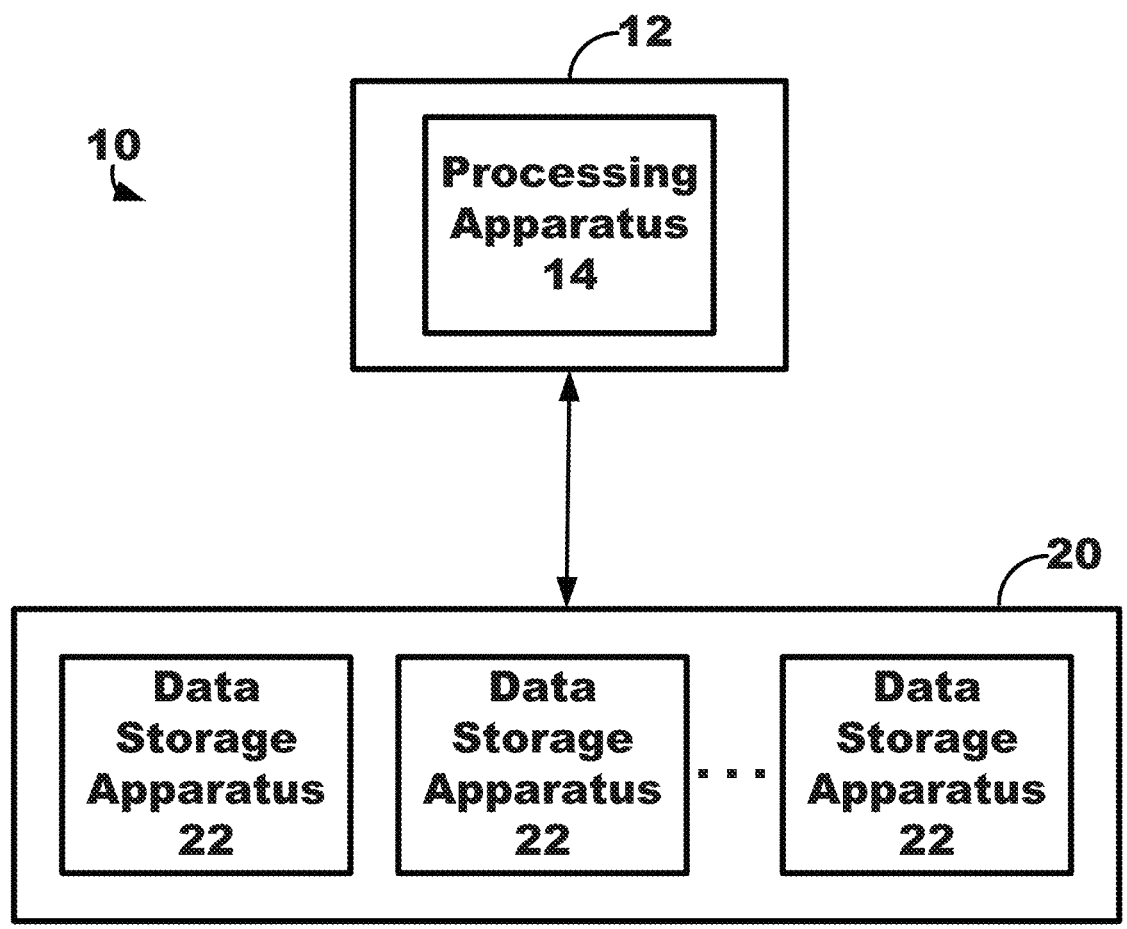
FIG. 1 is a block diagram of an exemplary system including a file system for storing data objects.

An exemplary system 10 for storing data objects is depicted in FIG. 1. The system 10 includes a host device 12 (such as, e.g., a personal computer, server, etc.) and a file system 20. The host device 12 may be operably coupled to the file system 20 to read and write data objects or files from and to the file system 20. Although a single host device is depicted, it is to be understood that the system 10 may include a plurality of host devices 12 operably coupled to the file system 20. Additionally, the file system 20 itself may include one or more computing apparatuses to provide functionality provided by the file system 20. More specifically, the one or more computing apparatuses of the file system 20 may include one or more processors configured to provide the reading and writing one or more data objects from the file system 20 and the one or more mechanisms and processes associated with the exemplary composite layouts described herein. For example, the host device 12 may request data from a data object from the file system 20, and the file system 20 may return the requested data of the data object. Further, for example, the host device 12 may attempt to write data to a data object of the file system 20, and the file system 20 may facilitate the writing of the data to the data object.

As shown, the file system 20 includes a plurality data storage apparatuses 22 for storing the data objects. The data storage apparatus 22 may include any device and/or apparatus configured to store data (e.g., binary data, etc.). The data storage apparatuses 22 can include, but is not necessarily limited to, solid state memory, hard magnetic discs, magnetic tapes, optical discs, integrated circuits, volatile memory, nonvolatile memory, and any combination thereof. Further, each data storage apparatus 22 may be an array of storage devices such as, e.g., a RAID (redundant array of inexpensive disks) storage arrangement. Each data storage apparatus 22 may be a server or virtual server. It is to be understood that this disclosure is not be limited to the system 10 depicted in FIG. 1, and instead, the system 10 is only one exemplary configuration. For example, file system 20 may include one or more of a local filesystem, a storage area network (SAN) file system, a distributed file system, a parallel file system, a virtual file system, and/or combinations thereof.

The file system 20 may be further described as a system designed to provide computer application programs on the host 12 with access to data stored on the data storage devices 22 in a logical, coherent way. Further, the file system 20 may be described as hiding the details of how data is stored on data storage devices 22 from the host 12 and application programs running on the host 12. For instance, the data storage devices 22 may be generally block addressable, in that data is addressed with the smallest granularity of one block, and multiple, contiguous data portions or chunks may define, or form, an extent. An extent may be defined as a portion of data within a data object or file. In other words, an extent may be described as a range of bytes within the data object or file. The size of the particular extent, e.g., 1040 kilobytes in length, may depend upon the type and size of the data storage apparatus 22. Application programs on the host 12 may request data from file system 20, and the file system 20 may be responsible for seamlessly mapping between application logical extends within a data object and physical space on data storage apparatus 22.

Existing file systems have used various methods to provide such mapping. For example, filesystems may use mapping information or meta data according to a layout to provide data location on data storage apparatuses 22 via lookup (e.g., extent lists in an inode in the case of a local filesystem such as the EXT4 file system, or a set of object/server pairs in a distributed system such as LUSTRE file system) or formulaically (e.g., parameters to a SWIFT ring). These existing file systems may suffer from an assumption that the layout remains mostly static. For example, modifying some or all of the data layout may typically require either a complete rewrite of lookup information or movement of the data itself to accommodate new parameters.

A layout may be defined as a description of where in a file system a particular set of data, for example, a file or data object, is located. As noted herein, an extent may be defined as a portion of data with a data object or file. The term "FID" is used throughout this disclosure to mean a "File Identifier," which may be used as a handle, or descriptor, to reference a particular layout. For some types of layouts, a FID may point to some metadata describing a layout formula and parameters to this formula for a series of extents in the file. Further, other types of layout mapping functions such as block bitmaps or extent lists may be used as well.

Figure 2:
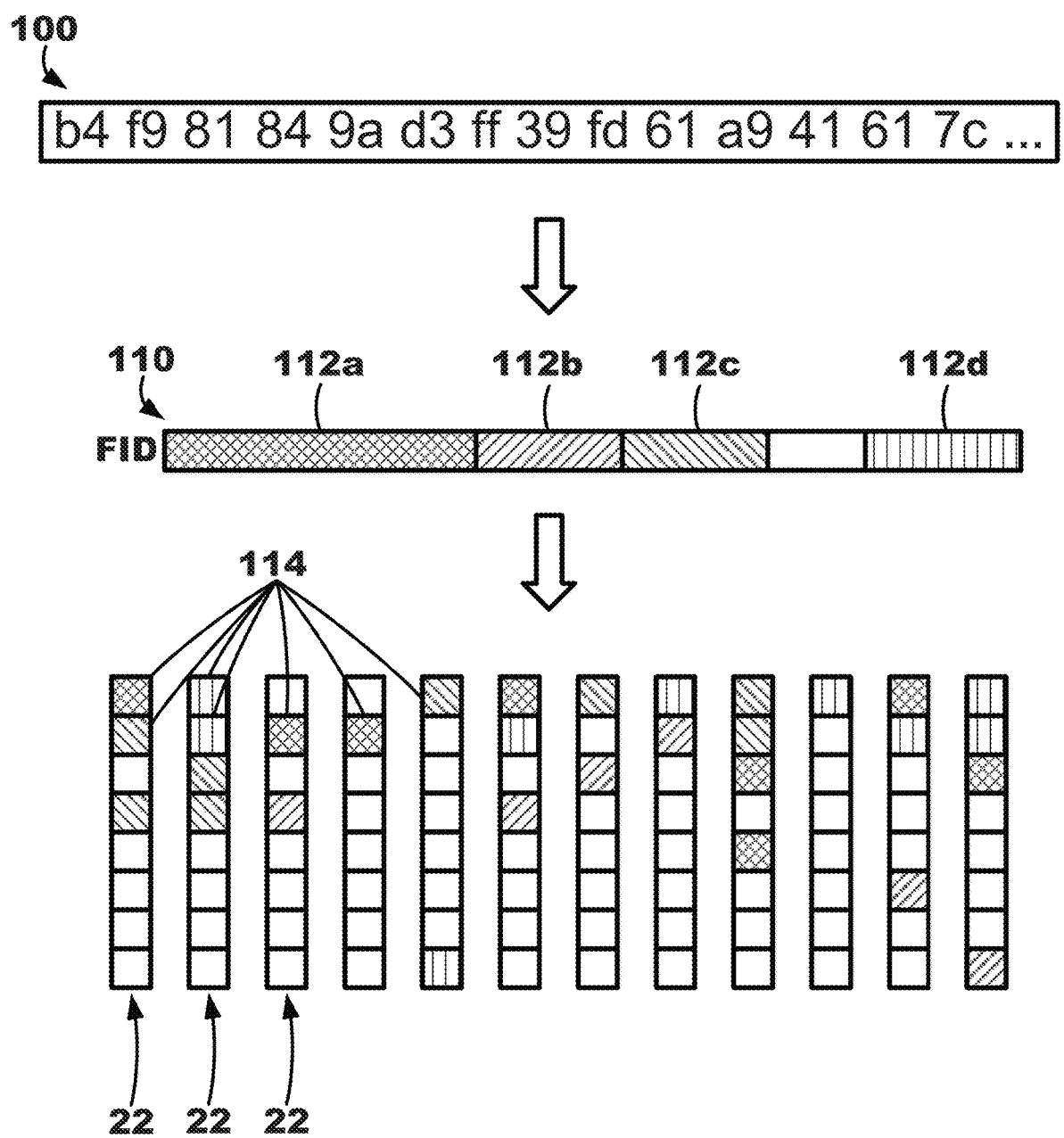
FIG. 2 is a diagrammatic representation of a "simple" layout corresponding to a data object for use with an exemplary system such as, e.g., depicted in FIG. 1.

A diagrammatic representation of a simple layout 110 referenced as FID corresponding to a data object, or file, 100 for use with an exemplary system is depicted in FIG. 2. The data object, or file, 100 is diagrammatically represented as a string of hexadecimal bytes. The layout 110 may correspond to the data object 100 such that the layout 110 extends from a left end to a right end representing the range of bytes within the data object 100 with the left end representing the beginning of the data object 100 and the right end representing the end of the data object 100. The layout 110 may include mapping information represented by hatching in FIG. 2 linking various extents 112 of the data object 100 to one or more locations 114 on the one or more storage apparatuses 22. The hatching of mapping information within the layout 100 corresponds to the size and location of the extent within the data object 100. In other words, the layout 110 may correspond to the data object 100 in that it describes where various extents 112 of the data object 100 are stored, or located, on the one or more storage apparatuses 22.

The extents 112 are depicted diagrammatically using hatching within the layout FID 110 of FIG. 2 to indicate which extents, or ranges, of the data object 100 include data, and thus, which extents have corresponding mapping information in the layout 110. For example, the hatched extents 112, or areas, of the layout 110 indicate that mapping information exists to link the extents 112 to the locations 114.

When data is to be written to the data object 100 or read from the data object 100 (e.g., by the host 12), the exemplary system may utilize a layout function to determine the mapping information for the data to be written to or read from the data object 100 from the layout 110. If new data is to be written to a portion, or section, of the data object 100, the layout function may determine the extents 112 where such portions, or sections, of the data object 100 resides within the file system 22 (e.g., on which storage apparatus 22, where within the storage apparatuses 22, etc.) based on the mapping information within the layout 110, and then such extents 112 or portions thereof of the data storage apparatuses 22 may be overwritten with the new data. If new data is to be read from a portion, or section, of the data object 100, the layout function may determine the extents 112 where such portions, or sections, of the data object 100 resides on the one or more storage apparatuses 22 based on the mapping information within the layout 110, and then such extents 112 or portions thereof of the data storage apparatuses 22 may be read.

The layout 110 shown with respect to FIG. 2 may be described as being a "simple" layout because the "simple" layout cannot represent more than one location on storage apparatuses for any overlapping extent ranges. For example, extent 112a and extent 112b in FIG. 2 cannot overlap because the location of any portion of the data object 100 in the intersection could not be resolved uniquely. Other storage systems may internally map an extent to multiple locations for data redundancy purposes. For example, an extent may be mapped to a pair of locations in a RAID1 configuration, where data is written to two physical devices and may be read from either one in case of a failure. More complex, yet fully resolvable schemes may be used as well, for example RAID6 or erasure coding schemes. However, these simple layouts used by themselves or in conjunction with a RAID configuration layouts remain statically fixed over time. Generally repairing RAID data by incorporating new devices or changing the desired location of a file involve wholesale movement of all the mapped extents of a file into a new static layout. In such cases these systems may temporarily hold two layouts for a file, the original and the new one, while such data migration (data copy to a new location) is taking place. Failure or interruption of the migration process typically requires restarting the process; only when migration fully complete is the new layout deemed active and the original layout is retired. Until this point the original layout remains active, meaning any new data writes to file extents will modify data in the locations pointed to by the original layout. If such writes occur during a migration, the migration process must be repeated to ensure that the new data is copied to the new layout locations. Such schemes are inherently inefficient, as data may have to be copied multiple times, and involve high latencies, as the entire file must typically finish migration before the new layout can become active.

To resolve these issues, the systems, methods, and processes described herein utilize an exemplary composite layout, or series of sub-layouts, each describing an arbitrary set of data objects with mapped extents or unmapped extents that are ordered as a "sieve." An unmapped extent may be thought of as a "hole" in the "sieve." Any extent not mapped by an upper sub-layout falls through to the next sub-layout in the sieve. More specifically, an exemplary composite layout may be composed of a set of sub-layouts that occupy a particular ordered rank in the composite layout structure. New writes may be directed to the highest-ranked sub-layout, and reads may be directed to the highest-ranked sub-layout that has a mapped extent for the file range requested. Further, by inserting new sub-layout layers at various ranks, and offering the ability to read and write directly to the sub-layouts, many useful behaviors can be instantiated.

The systems, methods, and processes described herein may use exemplary composite layouts 200 as shown in FIGS. 3-10 that are more useful than the layout 110 of FIG. 2 because, for example, the mapping information of the exemplary composite layouts 200 may to allow for different extents (e.g., portions, chunks, ranges, etc.) of a data object to be efficiently and effectively mapped, and may allow for easily remapping those extents dynamically. Further, the exemplary composite layouts 200 of the systems, methods, and processes may enable a series of desirable capabilities that can be implemented simply and efficiently, rendering a file system that is more capable, efficient, and stable. Still further, some features that are enabled by the composite layouts 200 of the exemplary systems, methods, and processes may include tiering/information lifecycle management (ILM), data locality, fault recovery, and data rebalance as will be described further herein.

Figure 3:
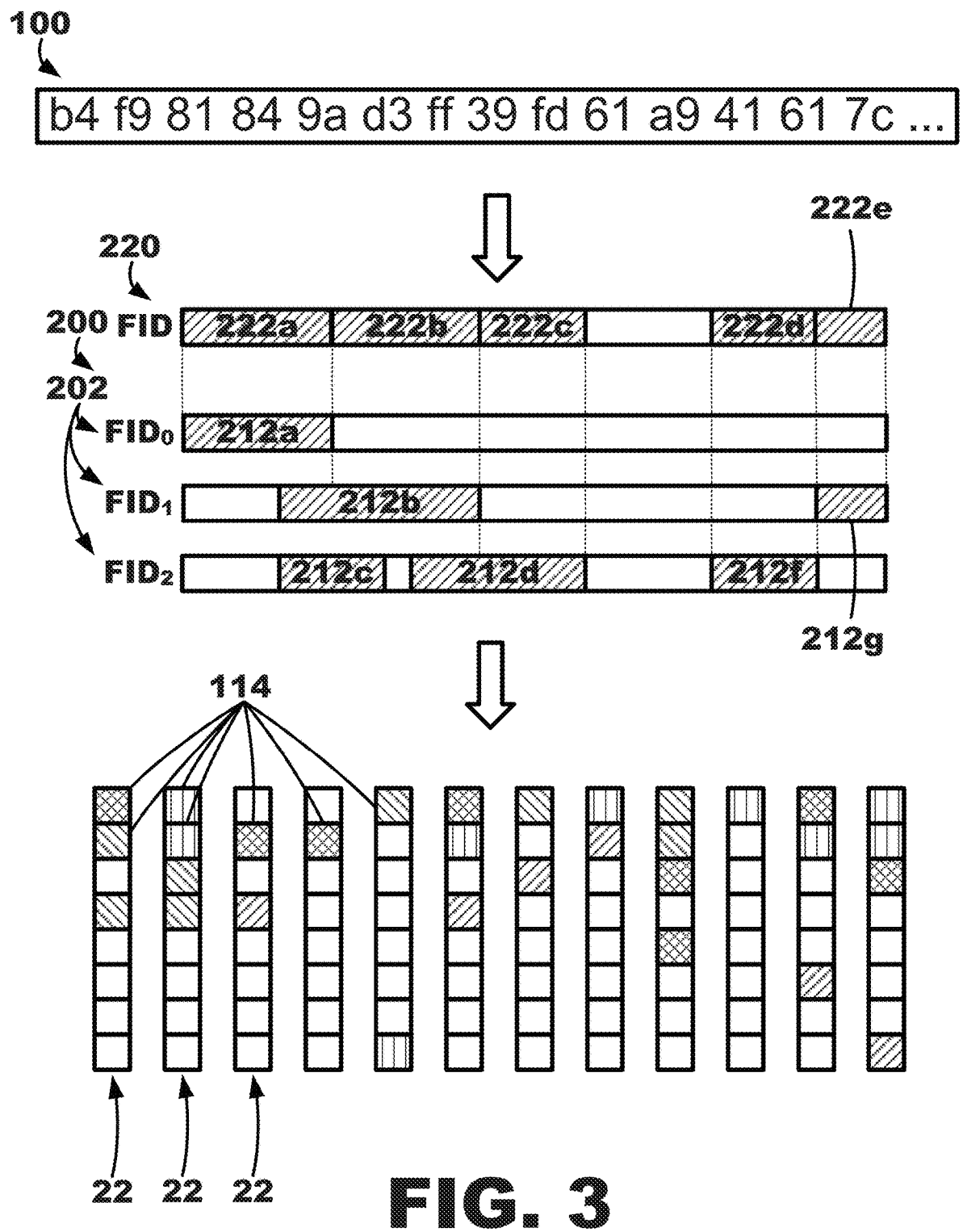
FIG. 3 is a diagrammatic representation of an exemplary composite layout corresponding to a data object for use with an exemplary system such as, e.g., depicted in FIG. 1.

Similar to the layout 110 as shown in FIG. 2, the exemplary composite layout 200 in FIG. 3 may correspond to a data object 100 stored on the one or more storage apparatuses 22 and may include mapping information linking the data object 100 to one or more locations 114 on the on the one or more storage apparatuses 22. Different than the layout 110 of FIG. 2, The exemplary composite layout 200 may include a plurality of sub-layouts 202 ranked from a lowest priority to a highest priority. As shown, each of the sub-layouts 202 may include the handle, or descriptor, "FID" and a numeral in subscript to indicate the priority level of the sub-layout 202. The subscript numeral may indicate priority in descending order with the highest priority sub-layout 202 having handle of "$FID_0$," and the lower priority sub-layouts having a handle with a larger numeral subscript. In this example, the lowest priority sub-layout 202 includes the handle "$FID_2$," which indicates a lower priority than sub-layouts 202 "$FID_0$" and "$FID_1$." In other words, the plurality of sub-layouts 202 may be tiered to form a cascading sieve with the higher priority sub-layouts 202 located in a higher tier than the lower priority sub-layouts 202.

Although the exemplary composite layout 200 depicted in FIG. 3 includes three sub-layouts 202, it is to be understood that the exemplary composite layout 200 is dynamic such that it may increase or decrease the amount, or number, of sub-layouts 202 to provide the functionality described further herein. More specifically, new sub-layouts 202 may further be added at deliberate, or selected, priorities within the composite layout 200, for example, as higher or lower than existing sub-layouts 202. Further, the ability of the composite layout 200 to include, or have, multiple sub-layouts 202 may allow overlapping extent ranges, which may also be useful to provide the functionality described herein.

Each of the sub-layouts 200 may include mapping information linking one or more extents 212 of the data object 100 to one or more locations 114 on the one or more storage apparatuses 22 where the one or more extents 212 of the data object 100 are stored. Similar to the layout 110, each sub-layout 202 corresponds to the data object 100 such that the sub-layout 202 extends from a left end to a right end representing the range of bytes within the data object 100 with the left end representing the beginning of the data object 100 and the right end representing the end of the data object 100. The extents 212 are depicted diagrammatically using hatching within the sub-layouts 202 to indicate which extents, or ranges, of the data object 100 have corresponding mapping information in the sub-layouts 202 to link the extents, or ranges, to locations 114 on the one or more storage apparatuses 20. In other words, the hatched extents 212, or areas, of the sub-layouts 202 indicate that mapping information exists to link the extents 212 to the locations 114 on the one or more storage apparatuses 20.

The exemplary composite layout 200 may be represented by a resultant layout 220 that is the result of the combination of the sub-layouts 202. Although the resultant layout 220 is depicted in each of FIGS. 3-10, it is to be understood that the resultant layout 220 may or may not be part of the exemplary composite layout 200 and is depicted in each of FIGS. 3-10 primarily for use in describing the exemplary systems, methods, and processes described herein. The resultant layout 220 may be provided based on the mapping information that is present for a particular extent in the highest priority sub-layout 202 that includes mapping information for the particular extent. In other words, when looking for mapping information for a particular extent or range, the highest priority sub-layout 202 may be examined, and if no mapping information exists for the extent or range, then the next the highest priority sub-layout 202 may be examined and so on.

For example, in FIG. 3 moving from left to right (e.g., from the beginning to the end of the data object 100) in the resultant layout 220, mapping information for the first extent 222a is provided by the mapping information for the extent 212a of the sub-layout 202 $FID_0$, which is the highest priority sub-layout 202 including mapping information for the first extent 222a. As shown, the sub-layouts 202 $FID_1$ and $FID_2$ also includes mapping information in extents 212b and 212c, respectively, that correspond to a portion of the first extent 222a of the resultant layout 220. However, the sub-layout 202 $FID_0$ has higher priority than each of the sub-layouts 202 $FID_1$ and $FID_2$, and thus, the mapping information of the sub-layout 202 $FID_0$ supersedes that mapping information in the sub-layouts 202 $FID_1$ and $FID_2$. In other words, the mapping information of sub-layouts 202 $FID_0$, $FID_1$, and $FID_2$ overlaps at extent 222a, and thus, the mapping information for the higher priority sub-layout 202, which is sub-layout 202 $FID_0$, takes precedence over lower priority sub-layouts 202.

Further, mapping information for the second extent 222b of the resultant layout 220 is provided by a portion of the mapping information for the extent 212*b* of the sub-layout 202 $FID_1$, which is the highest priority sub-layout 202 including mapping information for the second extent 222*b*. As shown, the sub-layout 202 $FID_2$ also includes mapping information in extent 212*c* that corresponds to a portion of the second extent 222*b* of the resultant layout 220. However, the sub-layout 202 $FID_1$ has higher priority than the sub-layout 202 $FID_2$, and thus, the mapping information of the sub-layout 202 $FID_1$ supersedes that mapping information in the sub-layout 202 $FID_2$. In other words, the mapping information of sub-layouts 202 $FID_1$ and $FID_2$ overlaps at extent 222*b*, and thus, the mapping information for the higher priority sub-layout 202, which is sub-layout 202 $FID_1$, takes precedence over lower priority sub-layouts 202.

Next, mapping information for the third extent 222*c* of the resultant layout 220 is provided by a portion of the mapping information for the extent 212*d* of the sub-layout 202 $FID_2$, the lowest priority sub-layout, because no higher priority sub-layouts 202 of the composite layout 200 include mapping information for the extent 222*c* of the resultant layout 220. Lastly, according to the priority functionality and logic described herein, the mapping information for the fourth extent 222*d* and the fifth extent 222*e* of the resultant layout 220 are provided by mapping information for the extent 212*f* of the sub-layout 202 $FID_2$ and by the mapping information of the extent 212*g* of the sub-layout 202 $FID_1$.

Figure 4:
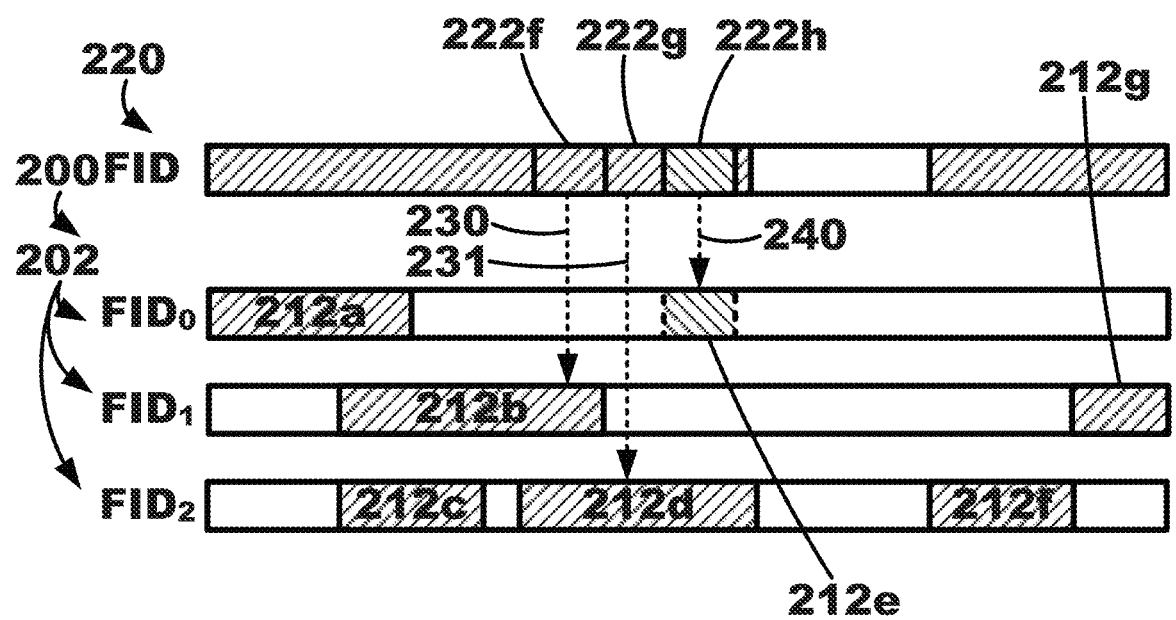
FIG. 4 is a diagrammatic representation of the exemplary composite layout of FIG. 3 during a write.

A pair of read processes 230, 231 is illustrated in FIG. 4. For example, a read request may be issued for an extent 222*f* of the data object 100 illustrated with respect to the resultant layout 220. The extent to be read in these examples may be referred to as a "read extent." The one or more locations where the read extent 222*f* may be determined using the exemplary composite layout 200. For example, the mapping information for the read extent 222*f* may be found in in the highest priority sub-layout 200 that includes one or more locations where the read extent 222*f* is stored. As shown, an arrow represents the first read process 230. The highest priority sub-layout 202 $FID_0$ is first probed, or consulted, to determine if it includes mapping information for the read extent 222*f*, which it does not. Then, the next highest priority sub-layout 202 $FID_1$ is probed, or consulted, to determine if it includes mapping information for the read extent 222*f*, which it does in extent 212*b*. Thus, mapping information for read extent 222*f* may be determined from the sub-layout 202 $FID_1$. After the mapping information for the read extent 222*f* is determined, data may be read from the one or more locations on the storage apparatus where the read extent 222*f* is stored.

Further, for example, the mapping information for the read extent 222*g* may be found in in the highest priority sub-layout 200 that includes one or more locations where the read extent 222*g* is stored. As shown, an arrow represents the second read process 231. The first and second highest priority sub-layouts 202 $FID_0$ and $FID_1$ are probed, or consulted, to determine if they include mapping information for the read extent 222*g*, which they do not. Then, the next highest priority sub-layout 202 $FID_2$ is probed, or consulted, to determine if it includes mapping information for the read extent 222*g*, which it does in extent 212*d*. Thus, mapping information for read extent 222*g* may be determined from the sub-layout 202 $FID_2$. After the mapping information for the read extent 222*g* is determined, data may be read from the one or more locations on the storage apparatus where the read extent 222*g* is stored.

Although the mapping information for the requested read extents may be found in a single sub-layout 202 as described with respect to the two read examples 230, 231, it is to be understood that mapping information for a request read extent may be found in multiple sub-layouts 202 when, for example, mapping information for the entire read extent cannot be found in a single sub-layout 202. In other words, a read extent may overlap an area of the composite layout where a higher priority sub-layout 202 only includes mapping information for a portion of the read extent, and thus, the mapping information for the remaining portion of the read extent may be found in one or more lower priority sub-layouts 202. An example of this situation where a read extent acquires mapping information from more than two sub-layouts 202 is described herein with respect to FIG. 5.

A write process 240 is further illustrated in FIG. 4. For example, data, or write data, may be requested to be written to an extent 222*h* of the data object 100 illustrated with respect to the resultant layout 220. The extent to be written to this example may be referred to as a "write extent." The mapping information of the highest priority sub-layout 202 $FID_0$ may be modified, or adjusted, link the write extent 212*e* to one or more write locations on one or more storage apparatuses where the write extent 222*h* is to be written.

In one or more embodiments, the one or more locations may already be determined (e.g., pre-determined), or allocated, for various extents in the sub-layouts 202, and as such, the mapping information may be modified to indicate that such extent 212*e* now corresponds to actually-written or mapped data (where before the "write," the mapping information for the extent 212*e* may have indicated that the locations were empty or unmapped ("holes"). Conversely, in one or more embodiments, the one or more locations may be determined (e.g., pre-determined), or allocated, in real time, or "on the fly," for new extents or ranges in the sub-layouts 202. Further, if the highest-priority sub-layout already includes mapping information for all or a portion of the write extent 222*h*, such mapping information may be overwritten by new mapping information of new locations or the write extent 222*h* may be written to the locations according to the already present mapping information (e.g., where the write extent 222*h* was previously stored on the one or more storage apparatuses).

In other words, FIG. 4 represents a composite layout formed from three simple layouts, where all writes to the data object represented by resultant layout 220 FID are directed into sub-layout 202 $FID_0$ while reads "fall through" unmapped, or empty, extents in the sub-layouts 202 FID0, FID1, and FID2 until the first sub-layout 202 with a mapped extent is encountered. If a read request has no mapped extents in any of the sub-layouts 202, then the data object, or file, may simply have no data stored at that extent and may return 0's or error conditions according to a file system policy.

Each of the sub-layouts 202 of the composite layout 200 may be accessed and/or referenced by the exemplary file system similar to as described with respect to the simple layout of FIG. 2, which may provide various advantageous functionality. For example, whether a file has a simple or composite layout 200, the handle ("FID") describing it or the sub-layouts 202 within a composite layout 200 may have the same format (such as, e.g., a 128-bit integer number). In other words, each sub-layout 202 may therefore be accessible as files in and of themselves, and any sub-layout 202 can be addressed as an individual file, where extents can be written and read directly, bypassing the hierarchical rules of the composite layout 200. Such mechanisms and functionality may be used as described herein.

A snapshot of a file or data object (or an entire file system) may freeze the file or data object (or the entire file system)

at a point in time such that no new writes to the file or data object (or the entire file system) can affect the snapshot of the previously stored data. New writes are instead made to a new "version" of the file or data object. The exemplary composite layout may effectively and efficiently provide snapshots of files or data objects as shown and described with respect to FIG. 5 where a diagrammatic representation of the exemplary composite layout of FIG. 4 is depicted undergoing a "snapshot."

Figure 5:
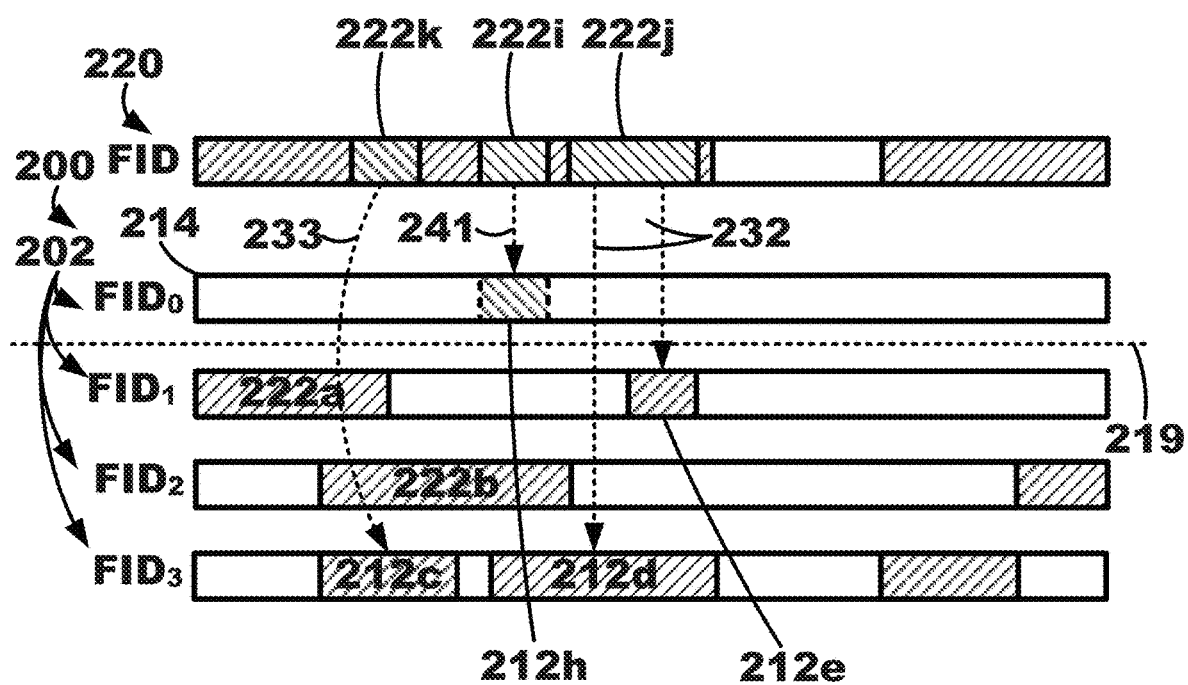
FIG. 5 is a diagrammatic representation of the exemplary composite layout of FIG. 4 undergoing a "snapshot."

To take or execute a snapshot, a new highest priority sub-layout 202 $FID_0$ may be added to or inserted into the composite layout 200. Execution of a snapshot of the data object or file may be in response to reception of a snapshot request from a host. As shown in FIG. 5, the new highest priority sub-layout 202 $FID_0$ is inserted above the previous highest priority sub-layout 202 $FID_0$ in the composite layout 200 shown in FIG. 4. Since this new sub-layout 202 is assigned the highest priority, it may be assigned the subscript numeral 0, while each of the subscript numerals for the previous sub-layouts 202 may be incremented by one. In effect diagrammatically, each of the previous sub-layouts 202 may be shifted down one level of priority while the new highest priority sub-layout 202 $FID_0$ is positioned on top of the previous sub-layouts 202. A dotted line 219 is shown to indicate the break between the previous sub-layouts 202 and the new highest priority sub-layout 202 $FID_0$.

The new highest priority sub-layout 202 $FID_0$ is empty when inserted or added to the composite sub-layout 200, which means that it does not include any mapping information for extents of the data object. New "writes" may be made to the data object, which may modify the mapping information in the new highest priority sub-layout 202 $FID_0$. For example, a write process 241 is further illustrated in FIG. 5 where write data may be requested to be written to an extent 222i of the data object 100 illustrated with respect to the resultant layout 220. The mapping information of the new highest priority sub-layout 202 $FID_0$ may be modified, or adjusted, to link the write extent 212h to one or more write locations on one or more storage apparatuses where the write extent 222i is to be written.

Further, "reads" may operate or function in the same way as described with respect to the composite layout 200 depicted in the FIG. 4. For example, mapping information for the read extent 222j may be found in in the highest priority sub-layouts 200 that include mapping information having one or more locations where the read extent 222j is stored. As shown, two arrows represent the read process 232, and the mapping information for the read extent 222j is found in the extent 212e of sub-layout 202 $FID_1$ and the extent 212d of sub-layout 202 $FID_3$, which are the highest priority sub-layouts 202 that include mapping information for the extent 222j.

In other words, using the exemplary composite layouts 200, a snapshot feature may be implemented by inserting a new, empty sub-layout 202 at a higher rank (such as $FID_0$ in FIG. 5) than the current layout. This insertion may be done, or executed, instantaneously without interruption and without copying any data. Additionally, if the composite layout 200 includes a single sub-layout 202 (e.g., due to flattening, etc.), the execution of a snapshot would, in effect, convert a data object from a previously "simple" layout into a composite layout by altering the layout description. Because there is now a higher rank sub-layout 202, all new writes to the data object are directed to the new sub-layout 202 instead of the old sub-layout 202. The old sub-layouts 202 are effectively "frozen," insulated from any new writes. At the same time, the data object itself is not frozen, as writes to the data object will be accepted into the new highest priority sub-layout 202 $FID_0$.

The data in this snapshot of previously stored data can, however, still be read by directly reading the previous sub-layouts 202. For example, the exemplary composite layout 200 may allow, or be configured to provide, access to previous versions of the data object using lower priority sub-layouts 202 that include mapping information for extents of the data object that have been overwritten (e.g., by changing the mapping information in a higher priority sub-layout 202). As shown diagrammatically in FIG. 5, arrow 233 represents a "read" of an extent 222k that has been overwritten or updated twice as noted by the mapping information for extents 222a and 222b in sub-layouts 202 $FID^3$ and $FID_2$, respectively. More specifically, the sub-layout 202 $FID_3$ may be directly interreacted with, or probed, to obtain mapping information for the extent 222k thereby bypassing the composite layout 200 and general read processes and mechanisms associated therewith. Thus, previous versions of portions of a data object may be effectively and efficiently retrieved using the exemplary composite layout 200.

In effect, a read for a read extent 222k of the data object that has been overwritten may be requested, and one or more read locations 114 on the one or more storage apparatuses 22 corresponding to the read extent 222k may be determined based on the mapping information in a sub-layout having lower priority, such as sub-layout 202 $FID_3$, than the highest priority sub-layout 202 $FID_0$ including the one or more read locations where the read extent 222k is stored on the one or more storage apparatuses 22. Then, data may be read from the one or more read locations 114 on the one or more storage apparatuses 22, and returned to the requester (e.g., a host device).

Figure 6:
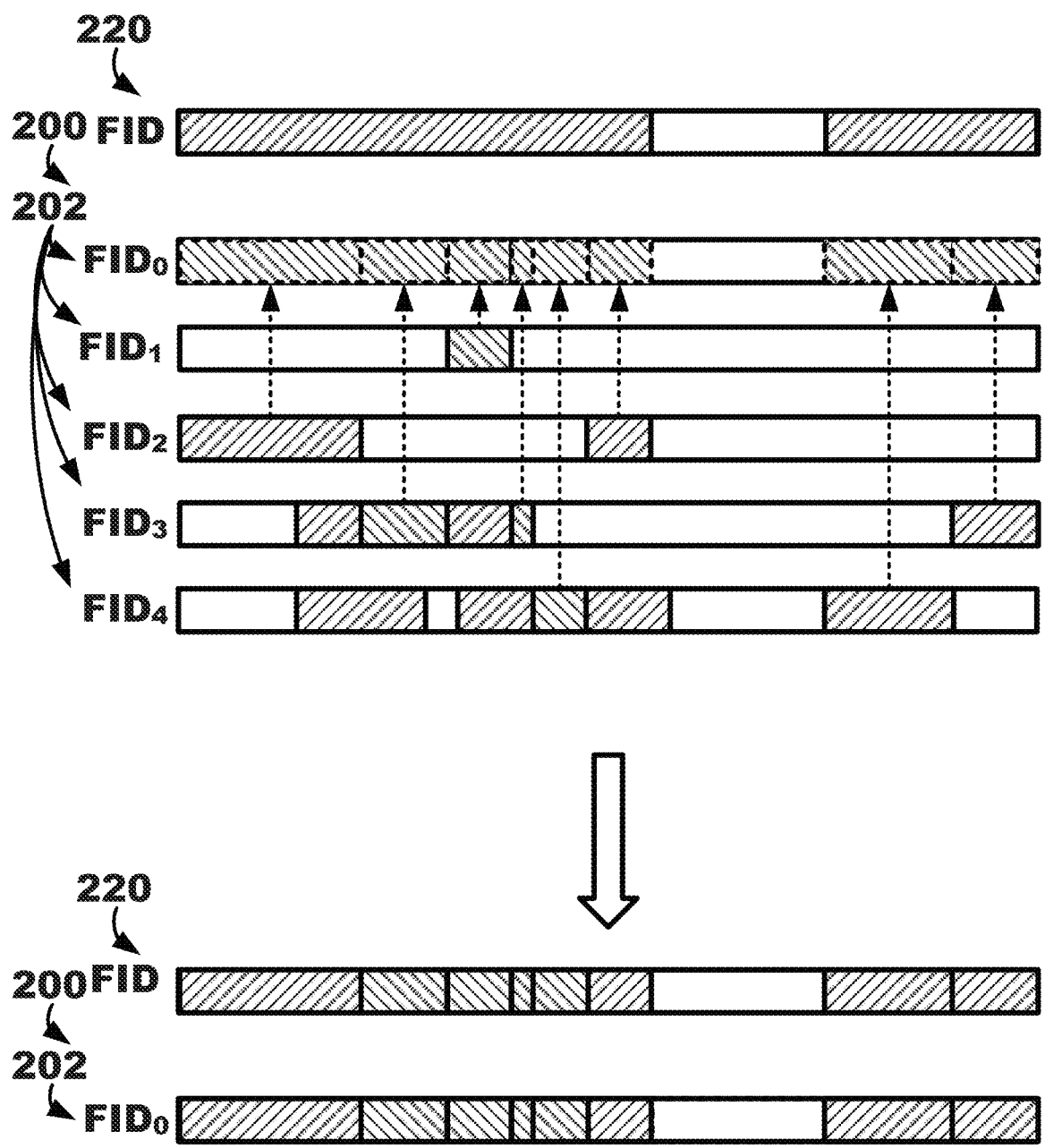
FIG. 6 is a diagrammatic representation of the exemplary composite layout of FIG. 5 undergoing a "flattening."

It may be desirable from time to time to "flatten" a composite layout 200 into a single sub-layout 202 (e.g., resembling a "simple" layout) to, for example, reduce the amount of metadata used to describe the composite layout 200 as shown in FIG. 6. As shown, a new highest priority sub-layout 202 $FID_0$ may be inserted above the previous sub-layouts 202, and all of the sub-layouts 202 may be combined into the new highest priority sub-layout 202 $FID_0$ (indicated by the dotted-line arrows) as shown in the upper portion of FIG. 6. In other embodiments, instead of inserting a new highest priority sub-layout 202, the sub-layouts 202 may be combined, or folded into, the already-present highest priority sub-layout 202.

Then, the previous sub-layouts having a priority less than the new highest priority sub-layout 202 $FID_0$ may be removed or deleted from the composite layout 200 as shown in the lower portion of FIG. 6. The mapping information in the higher priority sub-layouts 202 may take precedence, or priority, and thus, overwrite the mapping information in the lower priority sub-layouts 202 as indicated by the dotted line arrows similar to how a typical "read" operation accesses mapping information in the highest priority sub-layout 202. Thus, the result as shown in the lower portion of FIG. 6 may effectively be the resultant layout 220. In other words, the "flattened" new sub-layout 202 may be a mirror image of the resultant layout 220 described herein.

In other words, the exemplary composite layout 200 may be "flattened" by inserting a new sub-layout 202 $FID_0$ at higher rank than all other sub-layouts 202. New writes all land in the sub-layout 202 $FID_0$, while background prestaging processes, which will be described further herein with respect to FIG. 10, may be used to migrate, or copy, all data mapped in lower-ranked sub-layouts 202 up to sub-layout 202 $FID_0$. Once all the extents in the lower ranked sub-layouts 202 have been copied, those sub-layouts 202 are removed from the composite layout 200 and destroyed.

The exemplary composite layouts 200 and processes associated therewith may also be useful with respect to failure avoidance. For example, when a storage apparatus 22 (such as a disk drive or a storage server) in a file system 20 becomes temporarily unavailable due to a hardware problem or network connectivity issue, any write operations against that storage apparatus 22 may stall until the system resolves the issue. Automated resolutions may include retrying the failed operation, rebuilding data onto a spare storage apparatus 22, or continuing to operate in a degraded mode (e.g., reduced redundancy) for some RAID systems, which may be undesirable because such resolutions may take significant time and/or sacrifice data durability guarantees. The exemplary composite layouts 200 and processes associated therewith may handle these failure situations without time or durability penalties.

Figure 7:
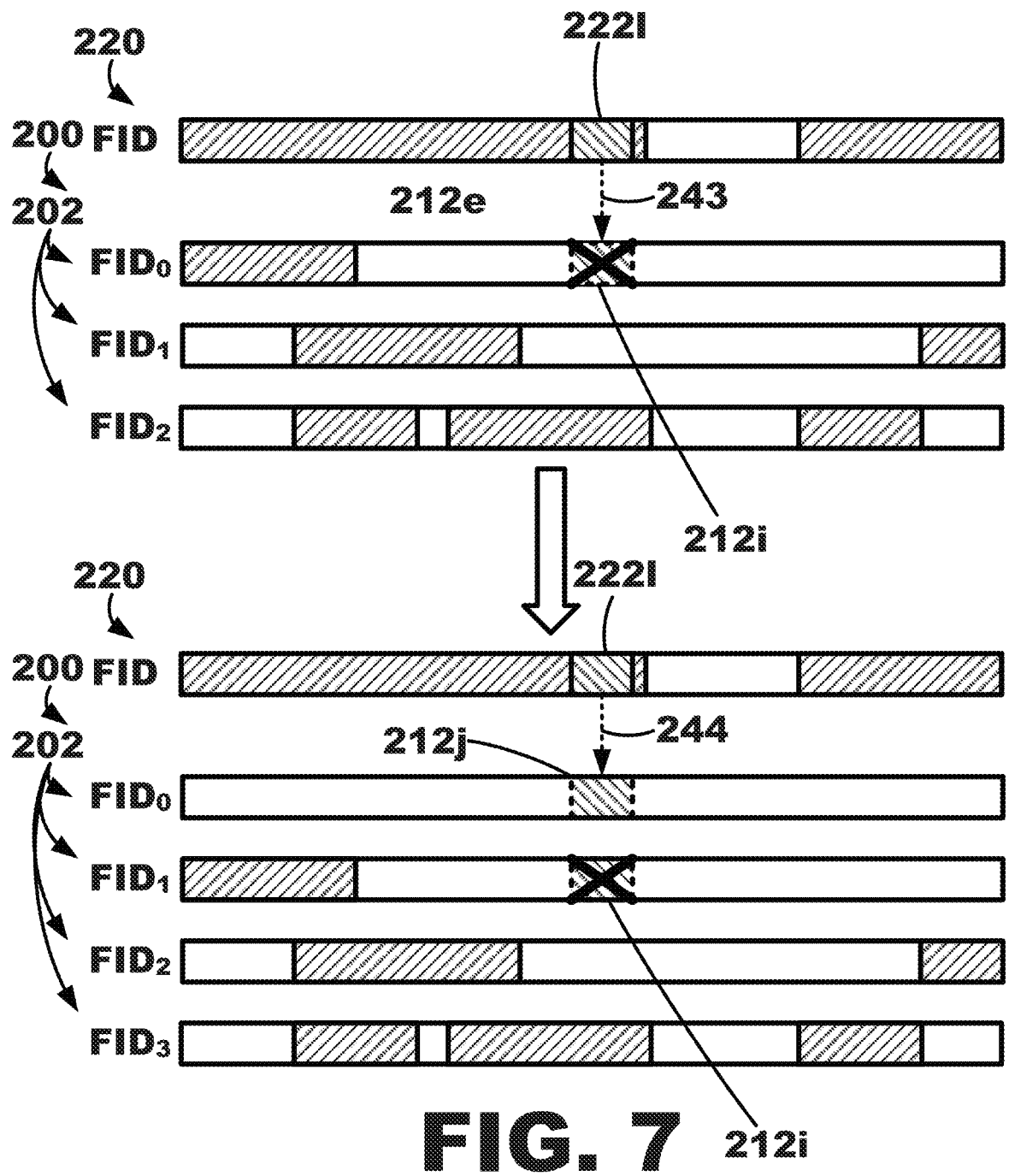
FIG. 7 is a diagrammatic representation of an exemplary composite layout corresponding to a data object for use with an exemplary system such as, e.g., depicted in FIG. 1, undergoing a failure avoidance process.

For example, write data to be written to a write extent 222*l* of a data object may be received, and thus, mapping information of the highest priority sub-layout 202 $FID_0$ as shown in the upper portion of FIG. 7 may be modified to link the write extent 212*i* to one or more first write locations 114 on one or more storage apparatuses 22 and the write data may be attempted to be written to the one or more first write locations 114. However, as indicated by the "X" through the extent 212*i*, the write attempt to the one or more first locations 114 on the one or more storage apparatuses 22 has failed (e.g., delay, device malfunction, etc.).

In response to the failure, a new highest priority sub-layout 202 $FID_0$ may be added to the composite layout 200 as shown in the lower portion of FIG. 7. The mapping information of the new highest priority sub-layout 202 $FID_0$ may be modified to link the write extent 212*j* to one or more second write locations 114 on one or more storage apparatuses and the write data may be written to the one or more second write locations 114 on the one or more storage apparatuses.

In other words, when a failure event is initially detected, a new sub-layout 202 $FID_0$ may be inserted at a higher rank than the current sub-layouts 202. This new sub-layout 202 $FID_0$ may be given particular layout mapping that avoids the failed storage apparatus such that, e.g., writes using the mapping information to the new sub-layout 202 $FID_0$ will not fail due to the same storage apparatus failure. This change in the composite layout 200 may not require a rebuild or retry time, and the new highest priority sub-layout 202 $FID_0$ can retain the original durability characteristics specified for the data object. Further, the layout change can be made arbitrarily aggressive; for example, any write that does not complete within a certain number of milliseconds may be treated as a "failure," a new highest priority sub-layout 202 $FID_0$ may be inserted into the composite layout 200, and the write may be redirected to the new highest priority sub-layout 202 $FID_0$. This failure avoidance functionality may effectively provide uninterrupted writes and/or maximize write throughput in multidevice systems. Further, sequential storage apparatus failures involving multiple storage apparatus may be handled in the same manner. For example, if a storage apparatus allocated or mapped in the new highest priority sub-layout 202 $FID_0$. should fail, yet another new highest priority sub-layout 202 $FID_0$ can be added at a higher rank into the composite layout 200.

Figure 8:
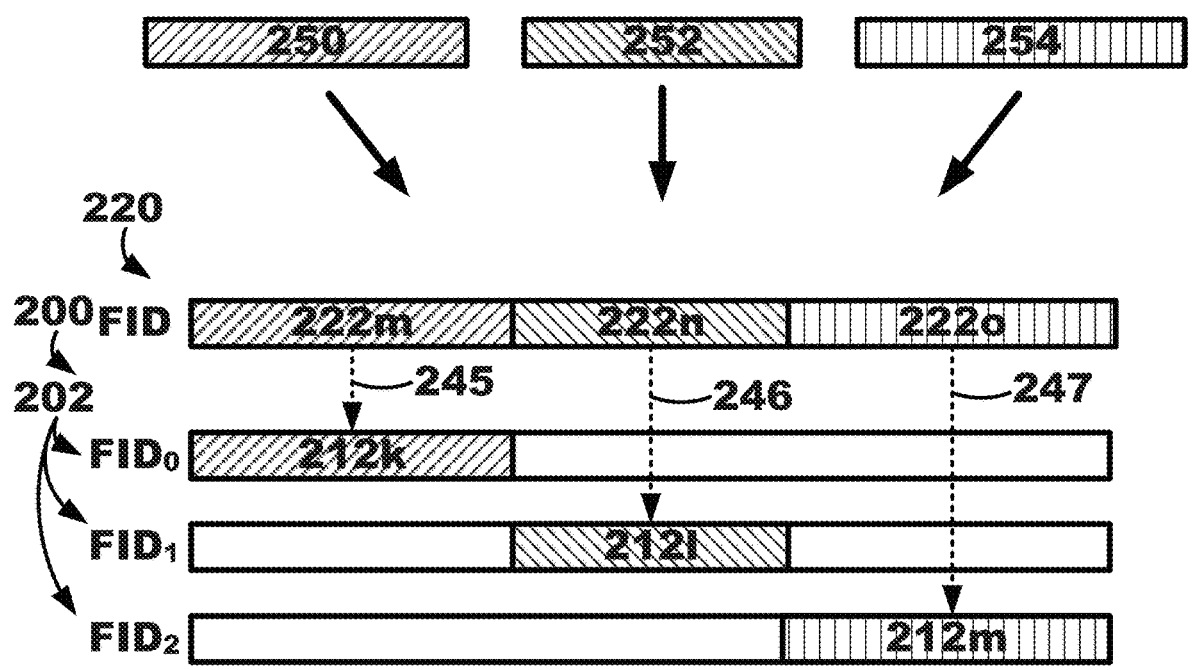
FIG. 8 is a diagrammatic representation of an exemplary composite layout corresponding to a data object for use with an exemplary system such as, e.g., depicted in FIG. 1, undergoing a multipart upload or write.

Many storage protocols (e.g., cloud-based storage protocols) may implement a "multipart upload," where large data objects or files are broken into separate chunks for parallel uploading to remote servers. Once a server has all the chunks that make up a data object or file, the chunks may be copied into a single data object or file on the server and the individual chunks deleted to avoid additional complexity in handling the chunks separately in other areas of the storage stack. The exemplary composite layouts 200 and processes associated therewith may efficiently and effectively handle multipart uploads as shown in FIG. 8.

A plurality of write data chunks 250, 252, 254 may be received that are to be written to a plurality of write extents 222*m*, 222*n*, 222*o* of a data object. In response, the mapping information of the plurality of sub-layouts 202 may be modified to link the plurality of write extents 212*k*, 212*l*, 212*m* to a plurality of write locations on one or more storage apparatuses. As shown, the mapping information for each of the plurality of write extents 212*k*, 212*l*, 212*m* may be modified in a different sub-layout 202 of the composite layout 200 than each other of the plurality of write extents 212*k*, 212*l*, 212*m*. Further, each write extent 212*k*, 212*l*, 212*m* may be written independently and directly to an individual sub-layout 202. For example, data chunk 250 may be written to write extent 212*m* directly as 202 $FID_0$, data chunk 252 may be written to write extent 212*l* directly as 202 $FID_1$, and data chunk 254 may be written to write extent 212*o* directly as 202 $FID_2$. Thus, the plurality of write data chunks 250, 252, 254 may be written to the plurality of write locations on the one or more storage apparatuses corresponding to different sub-layouts 202.

In sum, each write data chunks 250, 252, 254 may be stored in a file system using a different sub-layout 202. Further, if fewer sub-layouts 202 exist than the write data chunks being received, one or more new sub-layouts 202 may be added, or inserted, into the composite layout 200. In one or embodiments, a new sub-layout 202 may be inserted into the composite layout 200 for each of the plurality of write data chunks. After write data chunks 250, 252, 254 are stored in a file system using a different sub-layout 202 as described with respect to FIG. 8, a new highest priority sub-layout 202 may be inserted into the composite layout 200, and the composite layout may be flattened as described herein with reference to FIG. 6.

In other words, using the exemplary composite layout 202 and mechanisms associated therewith, each incoming data chunk 250, 252, 254 may be treated using a separate sub-layout 202 and writing directly to the locations dictated by the separate sub-layout 202. Further, reads to the data object or file may "fall through" the composite layout 200 to the appropriate chunk, which may eliminate the need to copy the data chunks 250, 252, 254 to a single data object and may allow the data object to be partially available for read concurrent with data upload. For example, some data chunks may arrive sooner than others, and the chunks that have been written to one or more locations of storage apparatuses may be accessible using the appropriate sub-layout 202 of the composite layout 200 before the slower arriving chunks have arrived and been stored. Further, data chunks can arrive in any order and may also be irregularly sized with no special handling. Additionally, data chunks may also partially overlap for upload redundancy in lossy environments or for optimizing chunk size to allow for particular checksum techniques. Lastly, after the data chunks 250, 252, 254 are written using separate sub-layouts 202, the composite layout 200 may be flattened into a single sub-layout 202.

The exemplary composite layouts 200 and processes associated therewith may also be useful when using various types of storage apparatuses. The exemplary composite layouts 200 may take advantage of different types of storage apparatuses to optimize storage, increase speed of reads and writes, etc. For example, different sub-layouts 202 may use different types of storage apparatus from a storage apparatus pool. There may be multiple storage apparatuses available with different performance or cost characteristics such as, for instance, a pool of flash-based storage apparatuses and pool of spinning disk-type storage apparatuses. One sub-layout 202 may choose from the flash-based storage pool, while another sub-layout 202 may choose from the spinning disk pool. With knowledge of how a particular application uses its data objects, a special optimized composite layout 200 might be created where, for example, particular, or selected, extents are written to the sub-layout 202 mapping to the flash-based storage apparatuses and other extents are written to the sub-layout 202 mapping to the spinning disk-type storage apparatuses. This functionality may allow applications to store rapidly changing data or file description data that might be accessed more frequently in a media type with better performance but greater cost.

Figure 9:
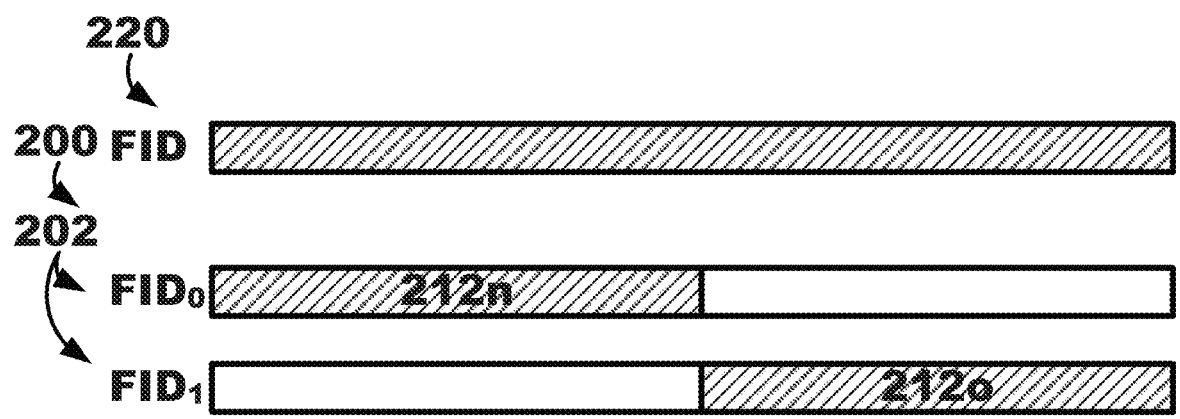
FIG. 9 is a diagrammatic representation of an exemplary application-optimized composite layout corresponding to a data object for use with an exemplary system such as, e.g., depicted in FIG. 1.
Figure 10:
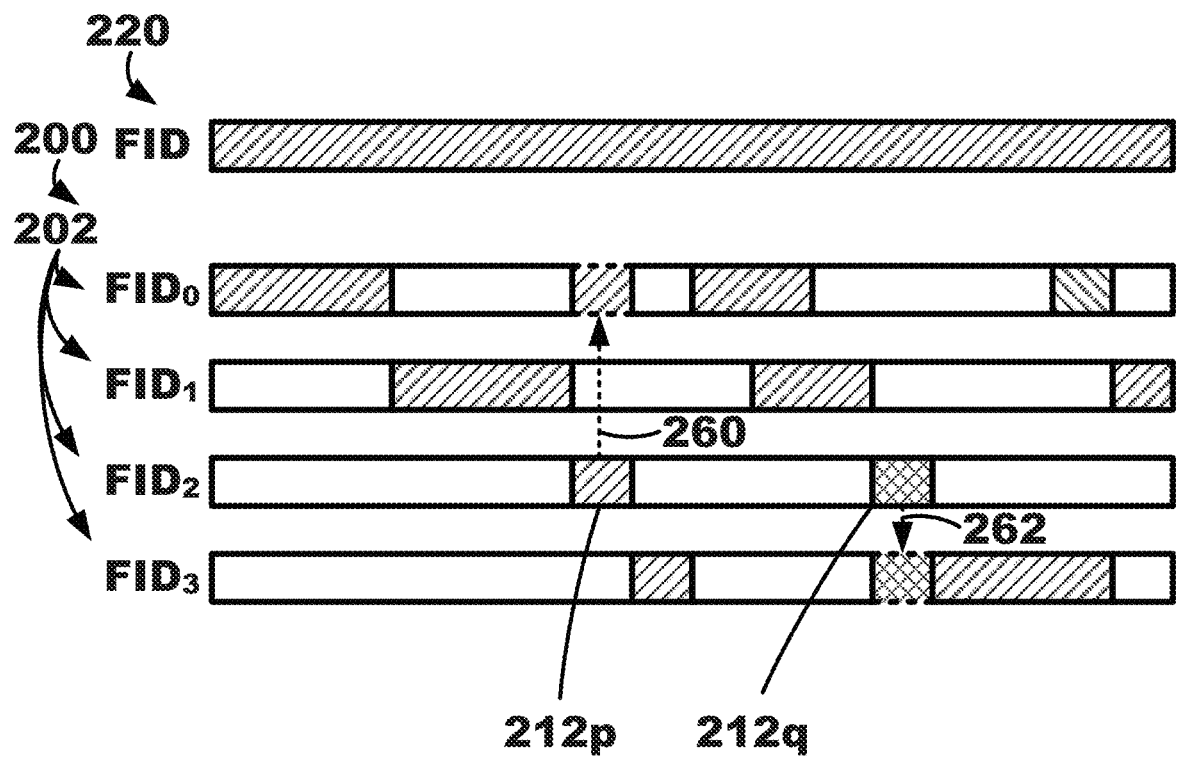
FIG. 10 is a diagrammatic representation of another exemplary application-optimized composite layout corresponding to a data object for use with an exemplary system such as, e.g., depicted in FIG. 1.

A diagrammatic representation of an exemplary application-optimized composite layout 200 corresponding to a data object at least two sub-layouts of the plurality sub-layouts correspond to different types of storage apparatus is depicted in FIG. 9. In this example, the highest priority sub-layout $FID_0$ may include mapping information linking extent 212n to one or more locations on a first type of storage apparatus while the lower priority sub-layout $FID_1$ may include mapping information linking extent 212o to one or more locations on a second type of storage apparatus. The first type of storage apparatus may be a faster, more time efficient storage apparatus such as, for example, flash-based storage apparatuses, volatile memory (e.g., RAM, ROM, NVRAM, EEPROM, STRAM, RRAM), faster spinning disk-type storage apparatuses, etc. The second type of storage apparatus may be a slower, more space efficient storage apparatus such as, for example, slower spinning disk-type storage apparatuses, etc.

The exemplary composite layouts 200 and processes associated therewith may also be useful when using various types of storage apparatuses in a multi-tier arrangement. One of the challenges for storage systems is the migration of data over time from active, to less active, to archival storage apparatuses, known variously as "tiering" or information lifecycle management (ILM). "Caching" can also be considered one form of tiering. The application-optimized composite layout 200 of FIG. 9 may be further defined to form an automatically-optimized composite layout 200 based on data "heat" (frequency of use) or other set policies, which may provide a full ILM solution as shown in described with respect to FIG. 10.

In this example, the higher priority sub-layouts 202 such as $FID_0$ and $FID_1$ may correspond to one or more of faster and more storage efficient storage apparatus than the lower priority sub-layouts 202 such as $FID_2$ and $FID_3$. Data may be migrated, or copied, to faster or slower storage apparatuses using the composite layout 200. For example, an extent 212p of a data object may be migrated (e.g., the data in extent 212p may be copied) as indicated by arrow 260 to one or more new locations on faster storage apparatus in response to one or more factors such as, e.g., frequency of use of the extent 212p (e.g., higher frequency of use), and further, the mapping information of the sub-layout 202 $FID_0$ corresponding to the faster storage apparatus may be modified to link the extent 212p to the one or more new locations of the faster storage apparatus. In one or more embodiments, when an extent in migrated "upwards" such as 212p, the older copies of extents may remain (e.g., not be deleted) in one or more old locations on the storage apparatuses and the mapping information in the lower priority sub-layout 202 $FID_2$ related thereto may also remain (e.g., not be deleted). In one or more embodiments, when an extent in migrated "upwards" such as 212p, the older copies of extents may be deleted in one or more old locations on the storage apparatuses and the mapping information in the lower priority sub-layout 202 $FID_2$ related thereto may also be deleted.

Further, for example, an extent 212q of a data object may be migrated (e.g., the data in extent 212q may be copied) as indicated by arrow 262 to one or more new locations on slower storage apparatus in response to one or more factors such as, e.g., frequency of use of the extent 212q (e.g., lower frequency of use), and further, the mapping information of the sub-layout 202 $FID_3$ corresponding to the slower storage apparatus may be modified to link the extent 212q to the one or more new locations of the slower storage apparatus. The older copy of the extent may be removed or deleted from one or more old locations on the faster storage apparatus and the mapping information of the sub-layout 202 $FID_2$ corresponding to the faster storage apparatus may also be removed or deleted. In other words, when an extent is migrated "downwards" such as 212q, the data in the older extent (in the one or more old locations on the faster storage apparatus) and the older mapping information in the higher priority sub-layout 202 $FID_2$ may be deleted or destroyed.

In one or more embodiments, the sub-layout 202 $FID_0$ may correspond to memory cache, the sub-layout 202 $FID_1$ may correspond to a pool of flash storage apparatuses, the sub-layout 202 $FID_2$ may correspond to a RAID6 layout of spinning disk-type storage apparatuses, and the sub-layout 202 $FID_3$ may correspond to a de-duplicated layout on archival storage devices. Over time, as data gets "colder" (e.g., ages without being accessed), background processes may de-stage 262 data from faster, more expensive, higher-ranked sub-layouts 202 to slower, cheaper, lower-ranked sub-layouts 202. For example, a "cold extent" 212q mapped in the sub-layout 202 $FID_2$ may be copied down into the sub-layout 202 $FID_3$. Once the copy of this extent 212q is complete, the extent 212q may be unmapped from the sub-layout 202 $FID_2$.

Per the exemplary composite layout 200 and processes thereof, new writes are mapped into the sub-layout 202 $FID_0$, the fastest tier, resulting in the greatest user-visible performance. Over time this new data will migrate down through the tiers as the de-staging processes proceed. The data may remain accessible transparently and without interruption via reads through the composite layout 200, even as data is being de-staged.

Additionally, data may also be "prefetched" 260 based on predicted-used based algorithms. For example, if a particular extent (X) is read, it is expected that an extent proximate the particular extent (X+1) within the data object might be read soon. Accordingly, a background process may be used to copy data at the proximate extent (X+1) from the composite layout 200 (which falls through the highest-ranked sub-layout 202 that maps that proximate extent) directly into the higher, or highest, priority sub-layout 200 such as the sub-layout 202 $FID_0$, so that if the file system user does indeed read the proximate extent (X+1), the data is available from the fastest tier.

Further, data rebalancing where data is moved to more uniformly loaded storage apparatus in a pool can be handled in a similar manner as tiering using the exemplary composite layout 200 and processes associated therewith. For example, a stacked redundancy model might have an upper tier (e.g., highest priority sub-layout 202 $FID_0$) with a simple triplicated sub-layout and a lower tier with a RAID6 layout, again with a background process to perform the RAID6 calculation "off line" and with the data at full durability. The extent in the highest priority sub-layout 202 $FID_0$ would then be unmapped after the RAID6 copy has been completed, thus converting a 200% redundancy overhead to a 20% redundancy overhead, for example.

Still further, the exemplary composite layout 200 and processes associated therewith may be useful for space efficient storage. For example, as typical filesystem use case (such as, for example, a database) may consist of a large file of mostly static information of which short extents are changed from time to time, which may represent a challenging situation to file system designers since it is desirable to simultaneously save space with an efficient layout of the large file (e.g. RAID6) yet provide a simple and fast way to change small extents (e.g. RAID1). A pure RAID6 layout may result in compute-intensive read-modify-write sequences for each small change while a pure RAID1 layout will be fast, but will consume more storage.

The exemplary composite layout 200 and processes associated therewith may utilize a highest priority sub-layout 202 $FID_0$ optimized for small block input/output (I/O) using, e.g., flash devices configured in RAID1. One or more sub-layouts 202 having lower priority than sub-layout 202 $FID_0$ may be optimized for storage efficiency such as, e.g., RAID6 on spinning-disk type storage apparatuses. The database may be stored in the sub-layouts 202 $FID_1$, $FID_2$, $FID_3$, etc. having lower priority than the highest priority sub-layout 202 $FID_0$. As changes are introduced to the database (which is the data object in this example), the changes are stored in the highest priority sub-layout 202 $FID_0$ consuming only small portions of the more expensive, faster storage. As more space in the highest priority sub-layout 202 $FID_0$ is used, an occasional or periodic background processes may de-stage the extents from the sub-layout 202 $FID_0$ to the lower priority sub-layouts 202 such as $FID_1$. Such de-staging processes can be designated to run only when the system can efficiently do so, e.g., when the system is not in heavy active use, or when a contiguous extent in the highest priority sub-layout 202 $FID_0$ is large enough to write a full RAID6 stripe (e.g., write without needing a read-modify-write process).

It will be apparent to one skilled in the art that elements or processes from one embodiment may be used in combination with elements or processes of the other embodiments, and that the possible embodiments of such systems, apparatus, devices, and methods using combinations of features set forth herein is not limited to the specific embodiments shown in the figures and/or described herein. Further, it will be recognized that timing of the processes and the size and shape of various elements herein may be modified but still fall within the scope of the present disclosure, although certain timings, one or more shapes and/or sizes, or types of elements, may be advantageous over others.

The methods and/or techniques described in this disclosure, including those attributed to the computing apparatuses of the host and/or file system, or various constituent components, may be implemented, at least in part, in hardware, software, firmware, or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, embodied in programs. The term "controller," "module," "processor," or "processing circuitry" may generally refer to any of the foregoing logic circuitry, alone or in combination with other logic circuitry, or any other equivalent circuitry.

Such hardware, software, and/or firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices and techniques described in this disclosure may be embodied as instructions on a computer-readable medium such as RAM, ROM, NVRAM, EEPROM, FLASH memory, STRAM, RRAM, magnetic data storage media, optical data storage media, the like, or any combination thereof. The instructions may be executed by one or more processors to support one or more aspects of the functionality described in this disclosure.

In the preceding description, reference is made to the accompanying set of drawings that form a part hereof and in which are shown by way of illustration several specific embodiments. It is to be understood that other embodiments are contemplated and may be made without departing from (e.g., still falling within) the scope or spirit of the present disclosure. The preceding detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

What is claimed is:

1. A system comprising:
one or more data storage apparatuses; and
computing apparatus comprising one or more processors and operably coupled to the one or more data storage apparatuses, the computing apparatus configured to:
define a composite layout corresponding to a data object stored on the storage apparatuses and comprising a plurality of sub-layouts ranked from a lowest priority to a highest priority, each sub-layout comprising mapping information linking one or more extents of the data object to one or more locations on the storage apparatuses where the extents of the data object are stored.

2. The system of claim 1, wherein the computing apparatus is further configured to:
receive write data to be written to a write extent of the data object;
modify the mapping information of the highest priority sub-layout to link the write extent to one or more write locations on the one or more storage apparatuses; and write the write data to the one or more write locations on the one or more storage apparatuses.

3. The system of claim 1, wherein the computing apparatus is further configured to:
receive a read request for a read extent of the data object;
determine one or more read locations on the one or more storage apparatuses corresponding to the read extent based on the mapping information in the highest priority sub-layout comprising the one or more read locations where the read extent is stored on the one or more storage apparatuses; and
read data from the one or more read locations on the one or more storage apparatuses.

4. The system of claim 1, wherein the computing apparatus is further configured to:
receive a snapshot request of the entire data object; and
add a new highest priority sub-layout to the composite layout in response to reception of the snapshot request.

5. The system of claim 1, wherein the computing apparatus is further configured to:
receive a read request for a read extent of the data object that has been overwritten;
determine one or more read locations on the one or more storage apparatuses corresponding to the read extent based on the mapping information in a sub-layout having lower priority than the highest priority sub-layout comprising the one or more read locations where the read extent is stored on the one or more storage apparatuses; and
read data from the one or more read locations on the one or more storage apparatuses.

6. The system of claim 1, wherein the computing apparatus is further configured to combine all of the sub-layouts into a single sub-layout, wherein the mapping information in the higher priority sub-layouts overwrites the mapping information in the lower priority sub-lay outs.

7. The system of claim 1, wherein the computing apparatus is further configured to:
receive write data to be written to a write extent of the data object;
modify the mapping information of the highest priority sub-layout to link the write extent to one or more first write locations on the one or more storage apparatuses; and
attempt to write the write data to the one or more first write locations on the one or more storage apparatuses;
add a new highest priority sub-layout to the composite layout in response to delay or failure in writing the write data to the one or more first write locations on the one or more storage apparatuses;
modify the mapping information of the new highest priority sub-layout to link the write extent to one or more second write locations on the one or more storage apparatuses; and
write the write data to the one or more second write locations on the one or more storage apparatuses.

8. The system of claim 1, wherein the computing apparatus is further configured to:
receive a plurality of write data chunks to be written to a plurality of write extents of the data object;
modify the mapping information of the plurality of sub-layouts to link the plurality of write extents to a plurality of write locations on the one or more storage apparatuses, wherein the mapping information for each of the plurality of write extents is modified in a different sub-layout of the composite layout than each other of the plurality of write extents; and
write the plurality of write data chunks to the plurality of write locations on the one or more storage apparatuses.

9. The system of claim 8, wherein the computing apparatus is further configured to add a new sub-layout to the composite layout for each of the plurality of write data chunks.

10. The system of claim 1, wherein at least two sub-layouts of the plurality sub-layouts correspond to different types of storage apparatus.

11. The system of claim 1, wherein the higher priority sub-layouts of the plurality of sub-layouts correspond to faster or more storage efficient storage apparatus of the plurality of storage apparatuses than the lower priority sub-layouts of the plurality of sub-layouts.

12. The system of claim 11, wherein the computing apparatus is further configured to:
migrate old data of an extent of the data object to one or more new locations of faster or slower storage apparatus in response to frequency of use of the extent;
modify the mapping information of the sub-layout corresponding to the faster or slower storage apparatus to link the extent to the one or more new locations of the faster or slower storage apparatus; and
remove the mapping information of the sub-layout linking the extent to one or more old locations of the storage apparatus if the one or more new locations are on slower storage apparatus.

13. A method comprising:
providing a composite layout for each of a plurality of data objects stored on one or more storage apparatuses, each composite layout comprising a plurality of sub-layouts ranked from a lowest priority to a highest priority, each sub-layout comprising mapping information linking one or more extents of each data object to one or more locations on the storage apparatuses where the one or more extents of the data object are stored; and
reading and writing the plurality of data objects using the composite layout for each of the plurality of data objects.

14. The method of claim 13, wherein reading and writing the plurality of data objects using the composite layout for each of a plurality of data objects comprises:
receiving write data to be written to a write extent of the data object;
modifying the mapping information of the highest priority sub-layout to link the write extent to one or more write locations on the one or more storage apparatuses; and
writing the write data to the one or more write locations on the one or more storage apparatuses.

15. The method of claim 13, wherein reading and writing the plurality of data objects using the composite layout for each of a plurality of data objects comprises:
receiving a read request for a read extent of the data object;
determining one or more read locations on the one or more storage apparatuses corresponding to the read extent based on the mapping information in the highest priority sub-layout comprising the one or more read locations where the read extent is stored on the one or more storage apparatuses; and
reading data from the one or more read locations on the one or more storage apparatuses.

16. The method of claim 13, the method further comprising:
receiving a snapshot request of the entire data object; and adding a new highest priority sub-layout to the composite layout in response to reception of the snapshot request.

17. The method of claim 13, wherein at least two sub-layouts of the plurality sub-layouts correspond to different types of storage apparatus.

18. The method of claim 13, wherein the higher priority sub-layouts of the plurality of sub-layouts correspond to faster or more storage efficient storage apparatus of the plurality of storage apparatuses than the lower priority sub-layouts of the plurality of sub-layouts.

* * * * *